Oct. 1, 1957  C. M. RASMUSSEN  2,808,284
LIFTERS FOR POTS AND PANS
Filed Dec. 20, 1955
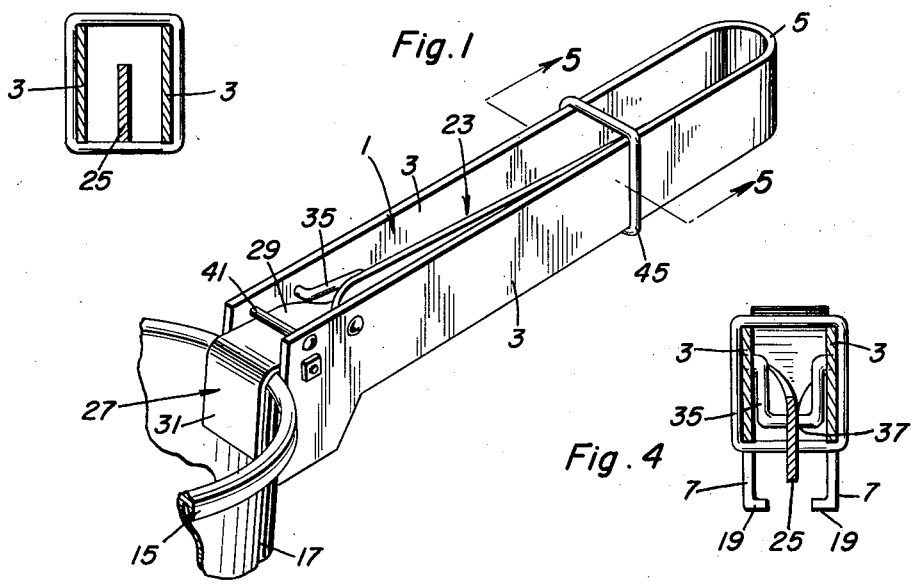
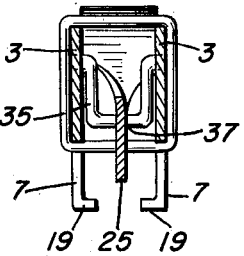
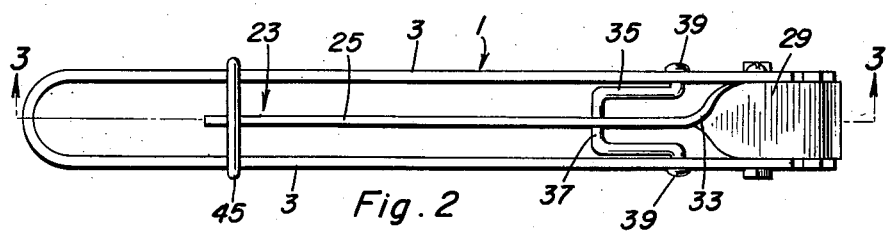
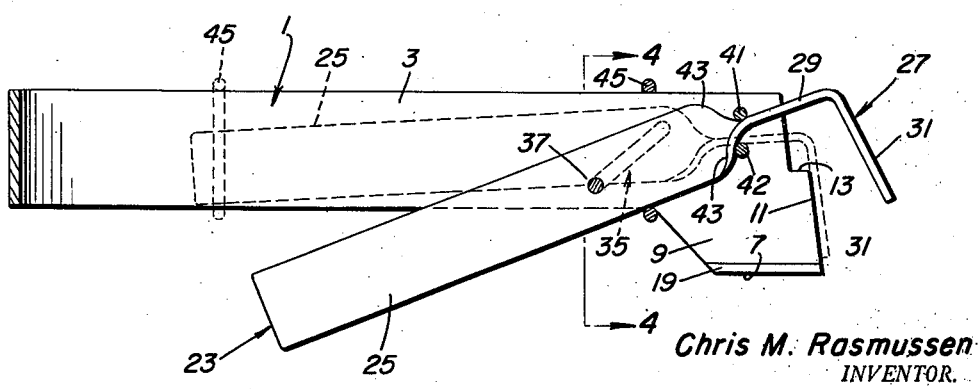
Chris M. Rasmussen
INVENTOR.

United States Patent Office 2,808,284
Patented Oct. 1, 1957

2,808,284
LIFTERS FOR POTS AND PANS
Chris M. Rasmussen, Bend, Oreg.
Application December 20, 1955, Serial No. 554,288
1 Claim. (Cl. 294—28)

My invention relates to improvements in pot and pan lifters of the general type in which a hand lever mounted on a handle is operative to swing a movable jaw into clamping relation to fixed jaws on the handle, whereby to grip a side of a pot or pan.

The primary object of my invention is to provide in a lifter of the specified type an improved one piece handle and jaws thereon, together with means for mounting the hand lever on the handle for movement both pivotally and longitudinally of the handle simultaneously for quick firm gripping action by the jaws.

Another object is to provide in conjunction with the above a single member for locking the lever to lock the jaws in tight gripping relation to a pot or pan in any position into which the hand lever is operated.

Other and subordinate objects, together with the precise nature of my improvements, will be readily understood when the following description and claims are read with reference to the drawing accompanying and forming part of this specification and in which:

Figure 1 is a fragmentary view in perspective of my improved lifter applied to a pot or pan;

Figure 2 is a view in plan;

Figure 3 is a view in longitudinal section taken on the line 3—3 of Figure 2 with parts shown in broken lines;

Figure 4 is a view in vertical transverse section taken on the line 4—4 of Figure 3; and Figure 5 is an enlarged view in vertical transverse section taken on the line 5—5 of Figure 1.

Referring to the drawing by numerals, the handle 1 of my improved lifter comprises a pair of flat side bars 3 spaced apart laterally in parallel relation, and connected by an outwardly rounded rear end 5 of the handle 1 integral with said bars 3.

The side bars 3 are formed with terminal, depending, bottom extensions 7 coplanar therewith and forming a pair of widened spaced front end jaws 9 on said handle which are provided with stepped front edges 11 forming substantially horizontal shoulders 13 for supporting the rim bead 15 of a pot or pan 17.

The hand lever 23 is formed of bar material and comprises a flat hand-grip portion 25 swingable edgewise between the side bars 3 and having a front, terminal, right angled movable jaw 27 thereon provided with a flat shank portion 29 overhanging the shoulders 13, and a downwardly extending beak portion 31 forwardly of the jaws 9 for gripping coaction therewith. The jaw 27 is formed on the hand-grip portion 25 by twisting the hand lever 23 a quarter turn, as at 33.

The means for mounting the hand lever 23 on the handle 1 comprises a U-crank 35 between the side bars 3 having a bight portion 37 journaled through the hand-grip portion 25 rearwardly of the jaw 27 for swinging of said lever 25 on said crank 35. The crank 35 is provided with lateral terminal trunnions 39 journaled in the side bars 3.

A pair of upper and lower transverse guide rods 41, 42 in the side bars 3 straddle the flat portion 29 of the jaw 27 forwardly of the crank 35 and between which said jaw 27 fulcrums and slides for a purpose presently seen.

Referring now to the operation and use of the lifter, as shown in Figure 3 in full lines, normally the hand lever 23 and jaw 27 counterweight the crank 35 so that it swings downwardly and forwardly in the handle 1 thereby moving said lever 23 longitudinally forwardly of the handle 1 and spacing the movable jaw 27 forwardly of the jaws 9, while at the same time, the shank portion 29 of the movable jaw 27 being confined between the guide rods 41 fulcrums and slides therebetween to tilt the hand lever 23 on the crank 35 upwardly and forwardly of the handle 1 thereby tilting the shank portion 29 and consequently the jaw 27 upwardly of the shoulders 13. Thus the jaws 9, 27 are fully opened relatively. The twist 33 forms shoulders 43 on the hand-lever 23 engaging the guide rods 41 to limit forward movement of said lever.

With the jaws 9, 27 opened, the movable jaw 27 is, by manipulation of the handle 1, placed over the bead 15 of the pot or pan 17 and the fixed jaws 9 are placed against the outer side of the pot or pan with the shoulders 13 below the bead 15, and then the hand-grip portion 25 of the hand lever 23 is squeezed upwardly into the handle 1 by the fingers of a hand grasping the handle 1. As the hand-grip portion 25 is thus moved upwardly, the crank 35 swings upwardly and rearwardly of the handle 1 thereby moving the hand lever 23 rearwardly. At the same time the guide rods 41 cause the shank portion and hence the lever 23 to swing downwardly on the crank 35 forwardly thereof to swing the movable jaw 31 downwardly. Thus the movable jaw is swung downwardly and moved rearwardly longitudinally of the handle 1 to close the jaws 27, 9, as shown in broken lines in Figure 3, and so that the jaws will coact to grip the side of the pot or pan firmly.

Locking means for hand lever 23 is provided comprising a slip ring 45 surrounding the handle 1 and slidable rearwardly thereon beneath the hand-grip portion 25 of said lever 23 into locking positions rearwardly of the crank 35, to lock said hand-grip portion 25 in up-swung position and thereby lock the jaw 27 in closed position relative to the jaws 9.

The jaws 9 are formed with bottom inturned edge flanges 19 for straddling the reduced portions of handle knobs of lids and inverted U-shaped handles of lids may be supported on the shoulders 13 so that the lifter is well adapted for lifting pan or pot lids.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention as claimed.

What is claimed as new is as follows:

A lifter for gripping a side of a pan comprising a handle embodying a pair of spaced parallel side bars having front ends provided with jaw forming edges, a hand lever extending longitudinally between said bars and having a terminal jaw for gripping coaction with said jaw forming edges, guide means in said handle in which said jaw is slidable and swingable into gripping relation to said edges, in response to swinging of said lever toward said handle and movement of said lever longitudinally rearwardly, and a U crank between said side bars having lateral ends journaled in said side bars and a bight portion journaled through said hand lever and whereby said hand lever is pivotally mounted for swinging toward and from said handle and movable rearwardly.

References Cited in the file of this patent
UNITED STATES PATENTS

| | | |
|---|---|---|
| 1,243,880 | Salisbury | Oct. 23, 1917 |
| 1,253,928 | Brammar | Jan. 15, 1918 |
| 1,901,729 | Brewer | Mar. 14, 1933 |
| 2,137,180 | Porro | Nov. 15, 1938 |